United States Patent [19]
Riegler et al.

[11] 4,080,014
[45] Mar. 21, 1978

[54] SLIDE ARTICULATION BEARING ASSEMBLY

[75] Inventors: Ernst Riegler, Enns; Manfred Schmidt, Linz, both of Austria; Manfred Memmel; Karl-Heinz Schutz, both of Schweinfurt, Germany

[73] Assignees: Vereinigte Osterreichische Eisen- und Stahlwerke - Alpine Montan Aktiengesellschaft, Linz, Austria; SKF Kugellagerfabriken Gesellschaft mit beschrankter Haftung, Schweinfurt, Germany

[21] Appl. No.: 713,834

[22] Filed: Aug. 12, 1976

[30] Foreign Application Priority Data

Aug. 14, 1975 Austria .................................. 6326/75

[51] Int. Cl.² .................... F16C 17/00; F16C 21/00

[52] U.S. Cl. .................................. 308/6 R; 308/1 R; 308/3 R; 308/72

[58] Field of Search ...................... 308/3 R, 6, 72, 73, 308/194, 207 R, 238, 1 A

[56] References Cited

U.S. PATENT DOCUMENTS 1,298,630  3/1919   Schmidt .............................. 308/1 A
3,929,389  12/1975  Riegler et al. ....................... 308/6 R Primary Examiner—Richard A. Bertsch
Attorney, Agent, or Firm—Brumbaugh, Graves, Donohue & Raymond

[57] ABSTRACT

A slide articulation bearing assembly, in particular to be used in a tiltable converter arrangement, has sliding elements between the bearing inner and outer races, and force measuring devices between one of the bearing races and the sliding elements.

9 Claims, 5 Drawing Figures

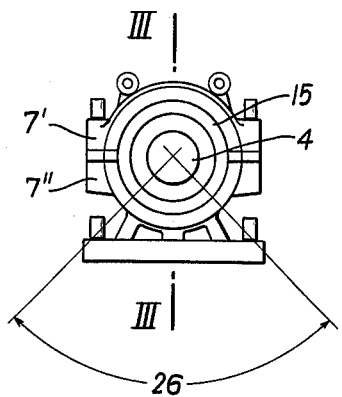
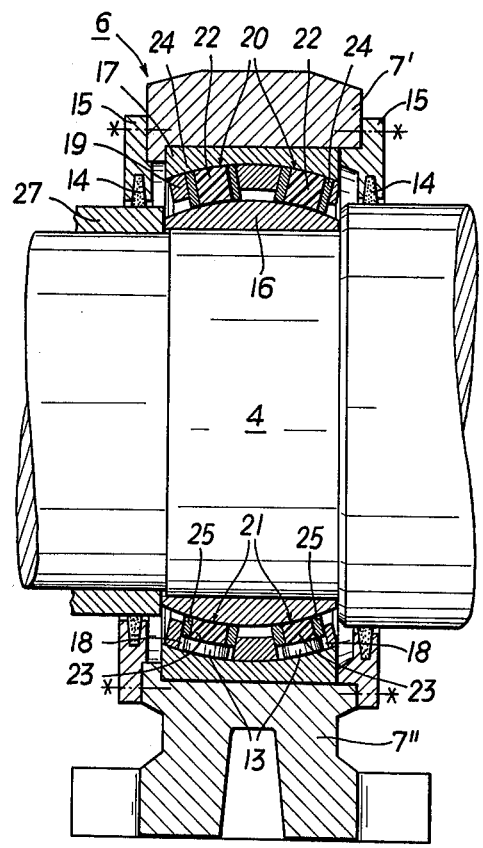

SLIDE ARTICULATION BEARING ASSEMBLY

BACKGROUND OF THE INVENTION

The invention relates to a slide articulation bearing, in particular for tiltable converters, having slide elements inserted between the inner and outer races of the slide articulation bearing.

Recently, weight changes of the materials charged have been used for controlling the production procedure in metal production processes, in particular in steel production processes. Thus precise determinations of the weight changes during the operation are of great importance.

It is known to supply converters with load cells for this purpose. Thus, e.g., load cells have been arranged below the pedestal construction of the bearing housings of the carrying trunnions, or the bearing housings of the carrying trunnions have been guided in the vertical direction by means of rollers in a load-cell-containing recess of the pedestal (British Pat. No. 1,373,652). In another apparatus the load cells have been arranged between the bearing housings and the supporting construction, the bearing housings being supported by means of plates or guide rods on the supporting construction which surround the housing thereby accommodating the horizontal forces.

The known apparatusses have, however, a number of disadvantages. Thus, on the one hand, the accommodation of the load cells as well as the guiding of the bearing housings in the vertical direction requires rather complicated mechanical structures which cannot always endure the rough conditions present in a steel plant; on the other hand, the known method of guiding the bearing housings do not guarantee that merely vertical forces act on the load cells and no transversal forces. Transversal forces falsify the measuring results and in extreme cases can lead to the destruction of the load cells. A further important disadvantage of known constructions consists in that a subsequent installation of load cells in already existent plants is difficult and expensive, since the bearing housings as well as the supporting construction have to be adapted to the requirements of the load cells.

SUMMARY OF THE INVENTION

The invention aims at preventing the described disadvantages and difficulties and has as its object to create a metallurgical vessel, in particular a converter for steel making plants, equipped with force measuring means, i.e. with load cells or wire strain gauges. In this vessel the mechanical construction for accommodating the load measuring means in much simpler than previous designs and the carrying trunnion bearing housings, as well as their supporting construction, are designed in the same manner as the bearing housings and the supporting constructions of currently used converters that are not equipped for weight determinations. As a result converter plants can be equipped with load measuring devices by the most simple means. Furthermore, a statically defined supporting and securing of the converter bearing relative to the supporting construction is to be realized in order to assure a strictly vertical impact of the load on the load measuring devices and to prevent the occurrance of transversal forces and other uncontrollable influences on the bearing faces of the load measuring devices, whereby a precise weighing is guaranteed.

According to the invention this object is achieved by using a slide-articulation bearing of the above-defined kind and by arranging load measuring devices between one of the bearing races and the slide elements. Advantageously, the weight is distributed upon a number of load measuring devices, so that each individual load measuring device need only be designed for a small load range. This has the advantage of a precise weighing operation, since load measuring devices having a smaller maximal load range have a substantially narrower load measuring tolerance.

A preferred embodiment to be used with a slide articulation bearing having slide elements, preferably made of synthetic material has the slide elements inserted in recesses of a cage provided between the inner race and the outer race. The inner race rests on the sliding faces of the slide elements (compare Austrian Pat. No. 315,590) and the load measuring devices are arranged between the outer race and the slide elements.

Preferably the load measuring devices are provided around part of the periphery only and are in the pressure zone of the bearing corresponding to about the lower 90° range of the periphery.

Suitably the slide elements are movably guided in the radial direction.

The invention also comprises two modified embodiments of the bearing construction.

According to the first one of the modified embodiments, the slide elements and the load measuring devices are inserted in recesses of a bushing that surrounds the bearing inset, the outer bearing race resting upon the load measuring devices. This embodiment is especially advantageous for expansion bearings as described in German Offenlegungsschrift 2,457,606, e.g. slide, articulation or antifriction bearings having a slide bushing axially displaceable within the bearing housing and whose inner race is secured in its position by spacing rings fastened to the carrying trunnion. These bearings are characterized in that cylindrical blocks are inserted as slide elements into the bores of the slide bushing, which advantageously are surrounded by sleeves comprised of bearing metal. In a bearing according to this embodiment the load measuring devices are arranged between the slide elements and the outer race of the slide, articulation or antifriction bearing.

The second one of the modified embodiments relates to a slide-articulation bearing known from German Utility Model No. 75.02.998 having slide elements inserted between the inner race and a slide bushing secured to the carrying trunnion of the converter. According to the invention the load measuring devices are inserted between the slide elements, that are arranged in recesses of the inner race and movably guided in the radial direction, and the inner race.

BRIEF DESCRIPTION OF THE DRAWINGS

The invention shall now be described by way of example only and with reference to the accompanying drawings, wherein:

FIG. 2 shws a view of a bearing in the direction of the arrow II of FIG. 1, wherein the tilting-drive is not illustrated;

FIG. 3 shows a vertical section through the axis of the carrying trunnion of a carrying trunnion bearing on an enlarged scale.

DESCRIPTION OF EXEMPLARY EMBODIMENTS

Figure 1:
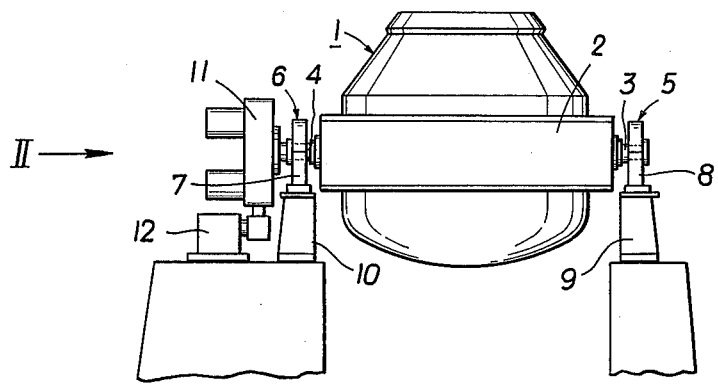
FIG. 1 shows an overall view of a converter with its bearings in front elevation.

In FIG. 1 a steel making converter 1 is inserted into a carrying ring 2 having two carrying trunnions 3 and 4. The carrying trunnions are mounted in an expansion bearing 5 and a fixed bearing 6, whose bearing housings 7 and 8 are connected to the base via pedestals 9 and 10. The carrying trunnion 4 associated with the fixed bearing is connected with a tilting drive 11, which is supported on the base via a torque support 12.

FIGS. 2 and 3 illustrate the construction of the fixed bearing 6 and its load measuring devices 13. The expansion bearing 5 and the load measuring devices associated therewith are designed in the same manner. The bearing housing 7 of the fixed bearing is composed of the bearing housing upper part 7' and the bearing housing lower part 7" as well as the lateral lids 15 provided with seals 14. Between the inner race 16 and the outer race 17, cylindrical slide elements 20 and 21 are inserted in bores 18 of the cage 19, as described in detail in Austrian Pat. No. 315,590. These slide elements comprise slide plates 22 and 23 made of synthetic material, and the supporting rings 24 and 25 surrounding these slide plates. Suitably, the width of the slide plates 22 and 23 (FIG. 3) when unloaded is somewhat greater than that of the supporting rings 24 and 25, i.e. by about the amount that the slide plates 22 and 23 compress when the bearing is loaded, so that the slide plates and the supporting rings 24 and 25 to have about the same width under load and the supporting rings participate in the load transmission. Thus the slide plates 22 and 23, which coact with the jacket face of the spherical inner race 16, are completely surrounded so that even at higher temperatures — when using synthetic material — neither creeping nor flowing can occur. The cage 19 is rigidly connected with the outer race so that the slide elements 20 and 21 cannot carry out the same movement as the inner race 16, but are forced to slide.

According to the invention, load measuring devices, in particular load cells 13, are inserted with play between the outer race 17 and the slide elements 21 in the bores 18 of the cage 19, 1.e. preferably in about the lower 90° peripheral range of the bearing denoted with 26 in FIG. 2. In principle, however, it is also possible to provide the entire periphery of the bearing with load measuring devices, in order to be able to also measure forces other than forces due to weight, e.g. the forces occurring during skull pushing. In the radial direction, the slide elements 21 are movably guided with a sliding seat in the cage 19, so that slide elements when loaded, reliably transmit the load to the force measuring devices 13 arranged therebelow, which devices yield under load. The sliding seat furthermore prevents movement of the slide elements 21 in the direction of the peripheral face of the inner race 16. As a result only forces acting perpendicular to the face of the inner race can act on the force measuring devices 13 and forces in the direction transverse thereto are accommodated by the cage.

The electrical conduits (not shown) of all the load measuring devices of a bearing are bundled in the bearing interior and led outside as one-strand.

While with load measuring devices arranged outside of the bearing housing only up to eight load measuring devices per bearing were used, with a bearing according to the invention — depending on the size of the bearing — it is easily possible to provide up to eighteen load measuring devices per bearing. A spacing bushing 27 serves for fixing the fixed bearing 6 on the carrying trunnion 4 and relative to the drive 11.

Figure 4:
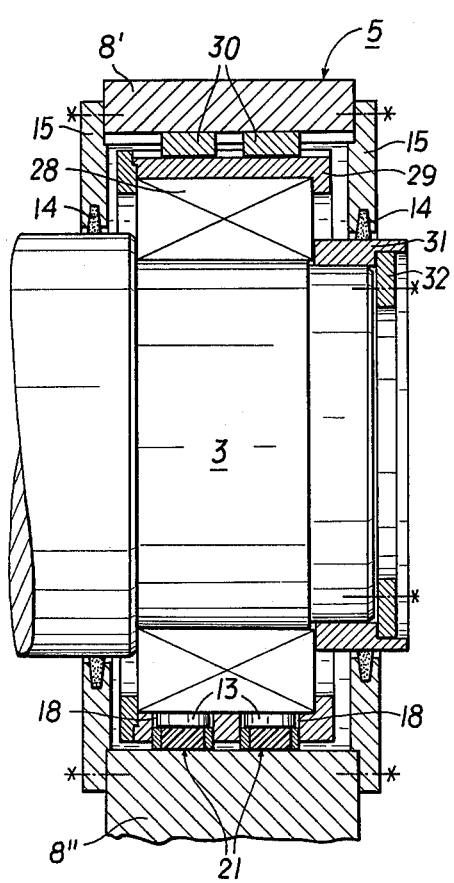
FIGS. 4 and 5 are sections like FIG. 3 of bearings according to the modified embodiments.

In FIG. 4 a modified embodiment of a bearing is illustrated, i.e. an expansion bearing 5 within the scope of the invention, in which load measuring devices are arranged between one of the bearing races and the slide elements. Parts corresponding to the parts illustrated in FIGS. 1, 2 and 3 are denoted with the same reference numerals. The expansion bearing trunnion 3 is mounted in a bearing inset 28; the bearing can be designed as a slide, articulation or antifriction bearing, in particular as a pendulum roller bearing. A hook-shaped slide bushing 29 is slipped over the outer race of the bearing, which slide bushing is secured against rotation relative to the lid 8' by means of feather keys 30.

According to the invention, in the pressure zone of the bearing, load measuring devices, in particular load cells 13, are inserted with slight play in bores 18 of the sliding bushing 19. Under the load measuring devices slide elements 21 designed as cylindrical blocks are inserted. The slide elements 21 are supported on the bearing housing lower part 8". In this bearing construction, too, the load measuring devices are preferably arranged in the pressure zone of the bearing corresponding to about the lower 90° peripheral area. A bushing 31 and an annular lid 32 screwed onto the front side of the carrying trunnion 3 serve for fixing the bearing inset 28 on the carrying trunnion 3.

Figure 5:
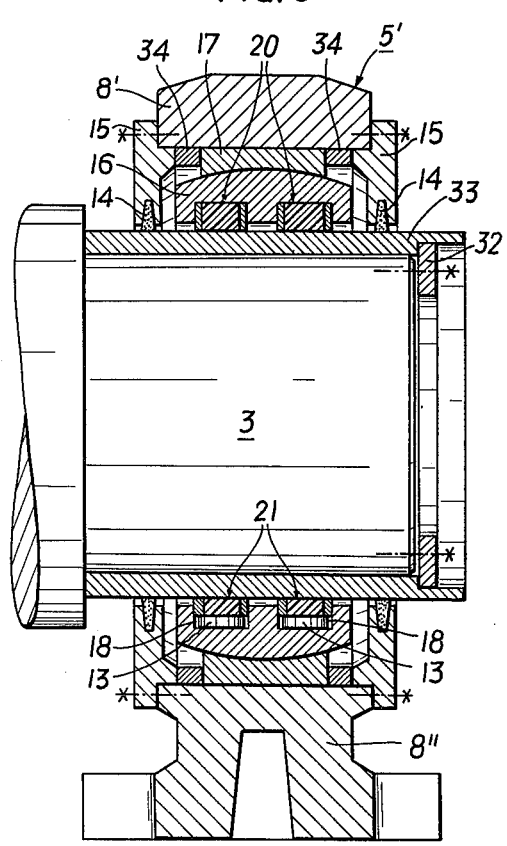

In FIG. 5 a further modified embodiment according to the invention is shown, which also relates to an expansion bearing 5' for a converter. Again parts functioning in the same manner have the same reference numerals. On the carrying trunnion 3 there is secured a slide bushing 33, and this bushing is fixed by an annular lid 32. The articulation bearing described in detail in German Utility Model No. 75.02.998 consists of an inner race having a crowned outer face and an outer race having a corresponding hollow spherical sliding face. The inner face is provided with a cylindrical bore. The articulation bearing 5' of the present invention differs from the embodiment described in German Utility Model No. 75.02.998 in that recesses 18 are provided in the inner race 16 for accommodating slide elements 20 and 21. The slide elements coact with the slide bushing 33, so that rotary movements and longitudinal displacements can take place between them, while tilting and adjusting movements only take place between the outer race 17 and the inner race 16. The slide elements 21 are radially movable and guided in their pertaining recesses 18, and the load measuring devices, in particular the load cells 13, are arranged between these slide elements 21 and the inner race 16 itself. Consequently radial forces can only act on the load measuring devices. Spacer rings 34 serve for fixing the outer race 17.

What we claimed is:

1. In a slide articulation bearing assembly, in particular to be used in a tiltable converter supporting arrangement, of the type including an inner race and an outer race and slide elements inserted therebetween, the improvement comprising force measuring devices arranged between one of the bearing races and the slide elements, the slide elements being movably guided in the radical direction of the bearing.

2. A slide articulation bearing assembly as set forth in claim 1 further including a cage provided between said inner race and said outer race and having recesses for accommodating said slide elements, said slide elements having slide faces bearing against said inner race, the force measuring devices being arranged between the outer race and the slide elements.

3. A slide articulation bearing assembly as set forth in claim 2, wherein the slide elements are made of synthetic material.

4. A slide articulation bearing assembly as set forth in claim 1, wherein the force measuring devices are arranged around part of the periphery of the bearing.

5. A slide articulation bearing assembly as set forth in claim 1, wherein the bearing assembly has a pressure zone extending over about 90° of the lower periphery of the bearing, the force measuring devices being arranged in said pressure zone.

6. In a slide articulation bearing assembly, in particular to be used in a tiltable converter supporting arrangement, of the type including a bearing inset containing an inner race and an outer race and a bushing surrounding said bearing inset, the improvement comprising recesses in said bushing, slide elements and force measuring devices inserted in said recesses, the outer race resting on said force measuring devices and the slide elements being movably guided in the radical direction of the bearing.

7. A slide articulation bearing assembly as set forth in claim 6, wherein the bearing assembly has a pressure zone extending over about 90° of the lower periphery of the bearing, the force measuring devices being arranged in said pressure zone.

8. In a slide articulation bearing assembly for a carrying trunnion of a tiltable converter of the type wherein a slide bushing is secured to the carrying trunnion of the tiltable converter and wherein a bearing including an inner race is provided, slide elements being inserted between said inner race and said slide bushing, the improvement which comprises recesses in said inner race, in which said slide elements are movably guided in the radial direction of the bearing, force measuring devices being inserted between said slide elements and said inner race.

9. A slide articulation bearing assembly as set forth in claim 8, wherein the bearing assembly has a pressure zone extending over about 90° of the lower periphery of the bearing, the force measuring devices being arranged in said pressure zone.

* * * * *

UNITED STATES PATENT OFFICE
CERTIFICATE OF CORRECTION

Patent No. 4,080,014　　　　　　　　Dated Mar. 21, 1978

Inventor(s) Riegler et al.

It is certified that error appears in the above-identified patent and that said Letters Patent are hereby corrected as shown below:

Col. 1, line 34, for "method" read --methods--; line 53, for "in" read --is--. Col. 2, line 14, after "material" insert a comma; line 40, "are characterized" should read --are also characterized--; line 63, for "shws" read --shows--. Col. 3, line 32, after "25" delete "to"; line 45, "1.e." should read --i.e.--; line 53, delete the comma after "19" and insert a comma after "elements". Col. 4, line 21, "19" should read --29--; line 57, for "claimed" read --claim--; line 65, "radical" should read --radial--. Col. 6, line 1, "radical" should read --radial--.

Signed and Sealed this

Fourth Day of July 1978

[SEAL]

Attest:

RUTH C. MASON
Attesting Officer

DONALD W. BANNER
Commissioner of Patents and Trademarks